(12) United States Patent
Kanegae et al.

(10) Patent No.: US 10,906,492 B2
(45) Date of Patent: Feb. 2, 2021

(54) PASSENGER PROTECTION APPARATUS FOR VEHICLE

(71) Applicant: SUBARU CORPORATION, Tokyo (JP)

(72) Inventors: Shota Kanegae, Tokyo (JP); Kenshi Eda, Tokyo (JP); Kazuya Yamane, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 230 days.

(21) Appl. No.: 16/170,472

(22) Filed: Oct. 25, 2018

(65) Prior Publication Data

US 2019/0241139 A1    Aug. 8, 2019

(30) Foreign Application Priority Data

Feb. 7, 2018 (JP) .................................. 2018-020256

(51) Int. Cl.
*B60R 21/0134* (2006.01)
*B60R 21/015* (2006.01)
(Continued)

(52) U.S. Cl.
CPC .......... *B60R 21/0134* (2013.01); *B60R 21/01* (2013.01); *B60R 21/01512* (2014.10);
(Continued)

(58) Field of Classification Search
CPC .......... B60R 21/0134; B60R 21/01512; B60R 21/01; B60R 21/16; B60R 22/48; B60R 2021/01286

See application file for complete search history.

(56) References Cited

U.S. PATENT DOCUMENTS 8,044,782 B2 * 10/2011 Saban .................... B60N 2/002
340/438
2001/0040065 A1 11/2001 Takagi et al.
(Continued)

FOREIGN PATENT DOCUMENTS

JP    H09-132111 A    5/1997
JP    2001-322532 A    11/2001
(Continued)

OTHER PUBLICATIONS

Japanese Office Action dated Sep. 3, 2019 for Japanese Patent Application No. 2018-020256 (4 pages in Japanese with English Translation).
(Continued)

*Primary Examiner* — Calvin Cheung
(74) *Attorney, Agent, or Firm* — Smith, Gambrell & Russell, LLP

(57) ABSTRACT

A passenger protection apparatus includes a detector, an adjuster, a controller, and a setting unit. The detector is configured to detect an environmental condition outside a vehicle; the adjuster is configured to be able to correct a sitting posture of a passenger to sit on a seat in a proper position; the controller is configured to control actuation of the adjuster; and the setting unit is configured to set a time frame divided into a plurality of frames until a predicted collision between an own vehicle and an object outside the vehicle, based on a result of detection by the detector. The controller controls the actuation of the adjuster to correct the sitting posture of the passenger in a correction frame at least contained in the time frame.

20 Claims, 4 Drawing Sheets

(51) Int. Cl.
  *B60R 21/16* (2006.01)
  *B60R 22/48* (2006.01)
  *B60R 21/01* (2006.01)

(52) U.S. Cl.
  CPC .............. *B60R 21/16* (2013.01); *B60R 22/48* (2013.01); *B60R 2021/01286* (2013.01)

(56) References Cited

U.S. PATENT DOCUMENTS

| | | | | |
|---|---|---|---|---|
| 2005/0131606 | A1* | 6/2005 | Motozawa | B60N 2/0232 701/45 |
| 2005/0209755 | A1* | 9/2005 | Sugiura | B60R 21/01538 701/45 |
| 2007/0017726 | A1* | 1/2007 | Takemura | B60R 21/0132 180/268 |
| 2011/0074190 | A1 | 3/2011 | Hashimoto | |
| 2011/0221247 | A1* | 9/2011 | Hashimoto | B60N 2/4279 297/216.13 |
| 2011/0227377 | A1* | 9/2011 | Swierczewski | B60N 2/42745 297/216.15 |
| 2011/0227378 | A1* | 9/2011 | Swierczewski | B60N 2/42754 297/216.15 |
| 2012/0032482 | A1* | 2/2012 | Hashimoto | B60N 2/42745 297/216.13 |
| 2013/0099908 | A1* | 4/2013 | Salomonsson | B60R 21/0134 340/425.5 |
| 2013/0300164 | A1* | 11/2013 | Jonsson | B60N 2/4228 297/216.1 |
| 2014/0278059 | A1 | 9/2014 | Gunther | |
| 2018/0043777 | A1* | 2/2018 | Ishibashi | B60Q 3/80 |
| 2020/0062146 | A1* | 2/2020 | Freienstein | B60R 21/01554 |

FOREIGN PATENT DOCUMENTS

| | | |
|---|---|---|
| JP | 2003-276539 A | 10/2003 |
| JP | 2005-145381 A | 6/2005 |
| JP | 2007-314015 A | 12/2007 |
| JP | 2009-292417 A | 12/2009 |
| JP | 2011-210102 | 10/2011 |
| JP | 2016-515275 A | 5/2016 |

OTHER PUBLICATIONS

Japanese Office Action dated Mar. 17, 2020, in Japanese Patent Application No. 2018-020256 (12 pages—Japanese with English machine translation).

* cited by examiner

PASSENGER PROTECTION APPARATUS FOR VEHICLE

The present application claims priority from Japanese Patent Application No. 2018-020256 filed on Feb. 7, 2018, the entire contents of which are hereby incorporated by reference.

BACKGROUND

1. Technical Field

The present invention relates to a passenger protection apparatus, more specifically to a passenger protection apparatus capable of consistently provide the protection performance of a protection device such as an airbag in a collision, regardless of the sitting posture of a passenger.

2. Related Art

Until now, various passenger protection apparatuses have been proposed. These passenger protection apparatuses perform, for example, driving support control based on the result of detection of the surrounding environment. There has been known a passenger protection apparatus configured to give an alarm and actuate a precrash system for a plurality of divided areas such as a recognition area, a judgement area, and a physical limit area, in order to notify the driver of a presence of a vehicle which requires collision avoidance without making the driver feel troublesomeness, which is disclosed, for example, in Japanese Unexamined Patent Application Publication No. 2011-210102.

SUMMARY OF THE INVENTION

An aspect of the present invention provides a passenger protection apparatus for a vehicle including: a detector configured to detect an environmental condition outside a vehicle; an adjuster configured to be able to correct a sitting posture of a passenger to sit on a seat in a proper position; a controller configured to control actuation of the adjuster; and a setting unit configured to set a time frame divided into a plurality of frames until a predicted collision between an own vehicle and an object outside the vehicle, based on a result of detection by the detector. The controller controls the actuation of the adjuster to correct the sitting posture of the passenger in a correction frame at least contained in the time frame.

An aspect of the present invention provides a passenger protection apparatus for a vehicle including: a detector configured to detect an environmental condition outside a vehicle; an adjuster configured to be able to correct a sitting posture of a passenger to sit on a seat in a proper position; and circuitry configured to control actuation of the adjuster and set a time frame divided into a plurality of frames until a predicted collision between an own vehicle and an object outside the vehicle, based on a result of detection by the detector. The circuitry controls the actuation of the adjuster to correct the sitting posture of the passenger in a correction frame at least contained in the time frame.

DETAILED DESCRIPTION

Figure 1:
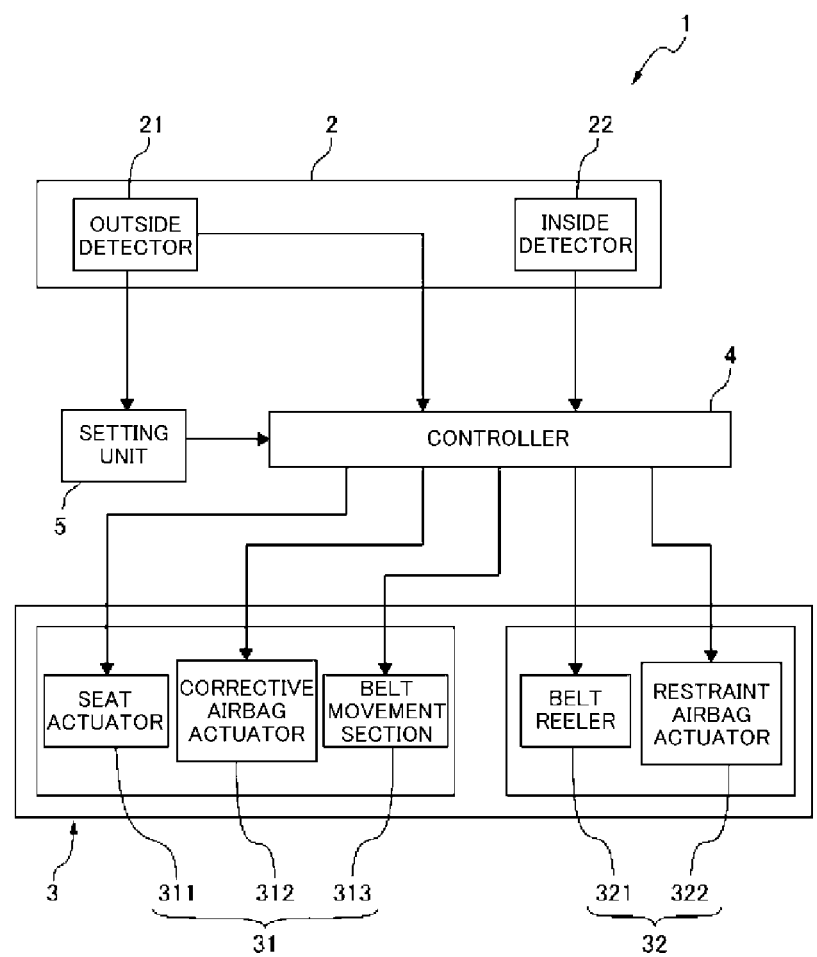
FIG. 1 is a block diagram schematically illustrating a passenger protection apparatus according to an example of the present invention.

Hereinafter, an example of the present invention will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In the case of the above-described vehicle which does not actuate the precrash system until just before a collision, when the precrash system is actuated, or when an airbag is actuated in a collision, the passenger may not sit in a posture which allows the passenger to be properly protected. Therefore, protection members such as an airbag and a seatbelt may not fulfill the satisfactory performance to protect the passenger, or rather, the protection members may harm the passenger.

Figure 2:
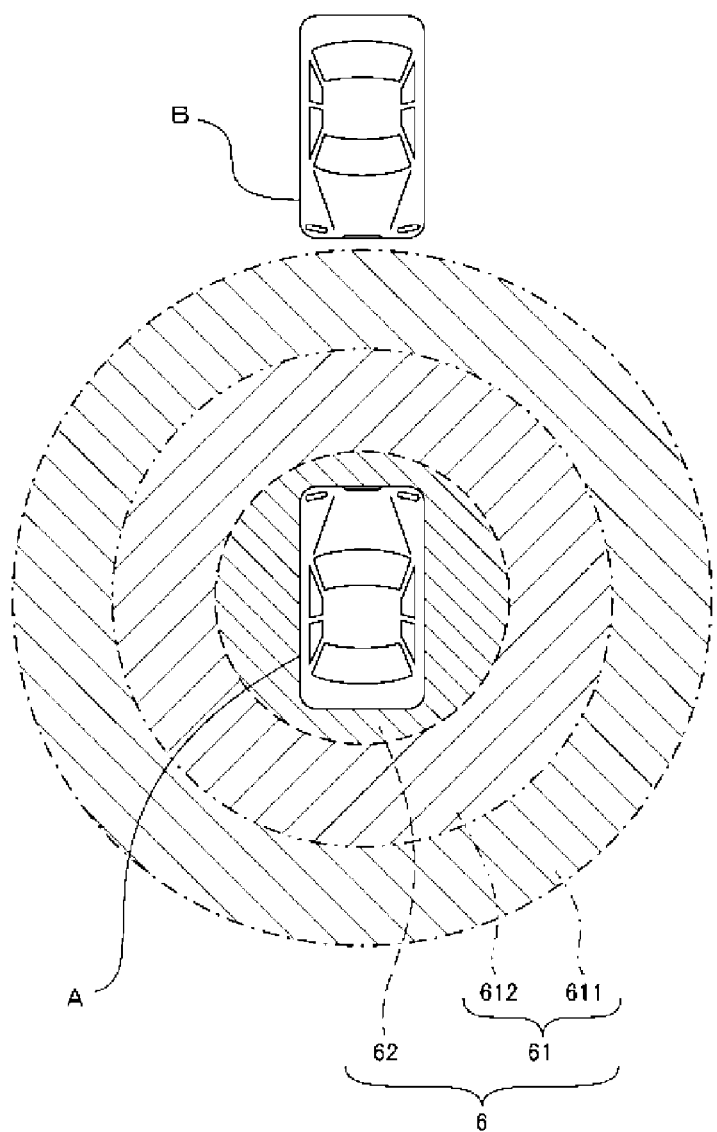
FIG. 2 is a plan view schematically illustrating time frames set by a setting unit illustrated in FIG. 1.
Figure 3:
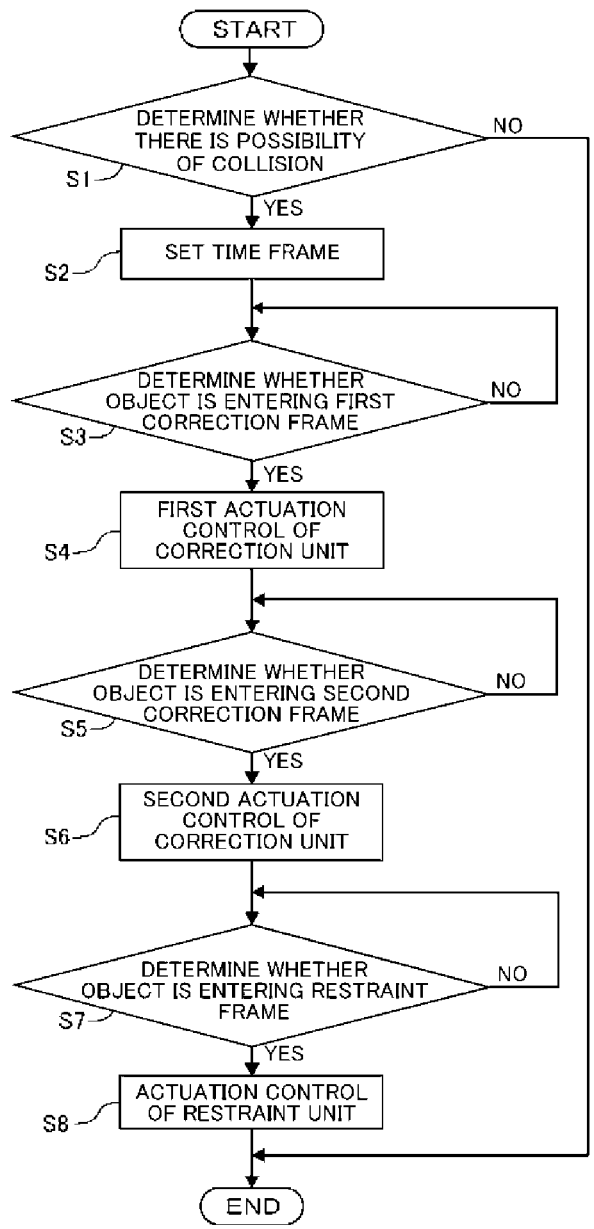
FIG. 3 is a flowchart illustrating a control process using the passenger protection apparatus illustrated in FIG. 1.

It is desirable to provide a passenger protection apparatus capable of consistently providing the protection performance of a protection device such as an airbag in a collision, regardless of the sitting posture of the passenger. FIG. 1 is a block diagram schematically illustrating a passenger protection apparatus 1 according to an example of the present invention. FIG. 2 is a plan view schematically illustrating time frames set by a setting unit 5 illustrated in FIG. 1. FIG. 3 is a flowchart illustrating a control process using the passenger protection apparatus 1 illustrated in FIG. 1.

As illustrated in FIG. 1, the passenger protection apparatus 1 includes a detector 2, an adjuster 3, a controller 4, and a setting unit 5.

The detector 2 includes an outside detector 21 and an inside detector 22. The outside detector 21 detects environmental conditions outside the own vehicle, for example, the presence or absence of another vehicle and an obstacle (hereinafter referred to as "object") around the own vehicle, the size of the object, the moving direction of the object, the absolute velocity of the object, and the relative velocity of the object to the own vehicle. For example, a car-mounted camera and a radar may be adopted as the outside detector 21. The outside detector 21 is configured to output the result of detection to the setting unit 5. The inside detector 22 detects environmental conditions inside the own vehicle, to be more specific, the presence or absence of a passenger on each of the seats in a passenger compartment, the position of the seat on which the passenger sits, the reclining state of the seat, and the sitting position and the sitting posture of the passenger. As the inside detector 22, for example, a passenger monitoring camera used in a driver monitoring system, an infrared radiation sensor, a pressure-sensitive sensor configured to detect the pressure distribution of a seat cushion, and a sensor for detecting the angle of inclination of the seat may be adopted. The inside detector 22 is configured to output the result of detection to the controller 4. Here, the detector is not limited as long as it is possible to detect at least environmental conditions outside the vehicle.

The adjuster 3 is provided in the seat to correct the sitting posture of the passenger to sit on the seat in at least a proper position. The adjuster 3 includes a correction unit 31 and a restraint unit 32. Upon receiving actuation signals from the controller 4, both the correction unit 31 and the restraint unit 32 of the adjuster 3 are actuated. The correction unit 31 corrects any posture of the passenger to sit on the seat in the proper position, and the restraint unit 32 restrains the passenger sitting on the seat in the proper position.

The correction unit 31 includes a seat actuator 311, a corrective airbag actuator 312, and a belt movement section 313. The seat actuator 311 is a member to move the seat. To be more specific, the seat actuator 311 is configured to be able to adjust the forward-and-backward sliding of the seat, and the angle of inclination of a seat back. The corrective airbag actuator 312 is a member to change the position of the passenger on the seat. For example, the corrective airbag actuator 312 may actuate a seat airbag, which is provided at least in the seat cushion or the seat back, and can form a convex portion in any location of the seat. This convex portion to correct the sitting posture may be formed by, instead of the seat airbag, a mechanism in which an elastic protrusion goes to and backs from the surface of the seat cushion or the seat back by using an actuator. The belt movement section 313 is a member configured to operate with the seat actuator 311 and the corrective airbag actuator 312. To be more specific, the belt movement section 313 may be a slide mechanism to move the seatbelt up and down, forward and backward, and right and left to set the seatbelt in an appropriate position to protect the passenger.

The correction unit 31, in particular, the seat actuator 311 and the corrective airbag actuator 312 are provided to move the passenger to the proper position for an appropriate sitting posture to benefit from the protection performance of, for example, deployment of the airbag in a collision, and reeling or locking of the seatbelt. That is, the sitting posture of the passenger on the seat in the proper position is expected by protection devices which are actuated in a collision. The sitting posture of the passenger is corrected, for example, by sliding the seat forward and backward and returning the reclined seat to the original or proper position by the seat actuator 311, and by deploying the airbag to eliminate or reduce the gap between the sitting position of the passenger and the proper position by the corrective airbag actuator 312.

The restraint unit 32 includes a belt reeler 321 and a restraint airbag actuator 322. The belt reeler 321 is a member to reel the seatbelt. To be more specific, the belt reeler 321 is provided on a reeling portion of the seatbelt to reel the seatbelt by a force enough to restrain the passenger by using a motor or explosion of gunpowder. The restraint airbag actuator 322 is a member to maintain the position of the passenger on the seat. To be more specific, the restraint airbag actuator 322 may actuate a seat airbag, which is provided at least in the seat cushion or the seat back, and can form a convex portion in any or a predetermined location of the seat. This convex portion to restrain the passenger may be formed by, instead of the seat airbag, a mechanism in which an elastic protrusion goes to and backs from the surface of the seat cushion or the seat back by using an actuator.

With the present example, the corrective airbag actuator 312 and the restraint airbag actuator 322 are separate members, and a corrective airbag and a restraint airbag (not illustrated) are also separate members. However, in a case where the correction of the posture of the passenger by the corrective airbag is performed approximately at the same time when the restraint of the passenger on the seat by the restraint airbag is performed, or the correction and the restraint are sequentially performed, the shape, the size, and the location of an airbag may be adopted to allow both the correction and the restraint, and a single airbag actuator may be used.

The controller 4 is configured to control the actuation of the adjuster 3. To be more specific, the controller 4 may be an ECU that electronically controls various in-vehicle devices. The controller 4 receives signals indicating the result of detection by the inside detector 22 and the time frames set by the setting unit 5, and outputs signals to control the actuation to the adjuster 3. The control and the operation of the controller 4 will be described later.

The setting unit 5 is configured to set a time frame divided into plurality of frames until a predictable collision between the own vehicle and an object outside the own vehicle, based on the result of detection by the detector 2. To be more specific, the setting unit 5 may be an ECU that electronically controls in-vehicle devices, and be built with the controller 4 in one member. The setting unit 5 is configured to output signals indicating the set time frame to the controller 4.

Here, the time frame set by the setting unit 5 will be described with reference to FIG. 2.

As illustrated in FIG. 2, the setting unit 5 sets a time frame 6 until a collision between an own vehicle A and an object B (another vehicle) moving in the opposing direction in front of the own vehicle A. With the present example, the time frame 6 is set by dividing a predictable period of time until a collision between the own vehicle A and the object B into a plurality of frames, and includes a correction frame 61 and a restraint frame 62. Moreover, the correction frame 61 contains a first collection frame 611 and a second correction frame 612. The time frame 6 may be set by dividing the period of time until a predictable collision equally or at a ratio based on the time required to actuate the correction unit 31 and the restraint unit 32 in the corresponding frames.

The correction frame 61 is set to actuate the correction unit 31 illustrated in FIG. 1 in order to correct the sitting posture of the passenger. The correction frame 61 contains the first correction frame 611 and the second correction frame 612. The first correction frame 611 is set before the second correction frame 612. Therefore, the first correction frame 611 is controlled by the controller 4 earlier than the second correction frame 612. In the first correction frame 611, the controller 4 controls the actuation of the seat actuator 311 of the correction unit 31. In the second correction frame 612, the controller 4 controls the actuation of the corrective airbag actuator 312 of the correction unit 31. The sitting posture of the passenger is corrected to different postures in the first correction frame 611 and the second correction frame 612, respectively, and the actuation of the correction unit 31 is controlled in a plurality of steps corresponding to the first correction frame 611 and the second correction frame 612, respectively. Here, with the present example, the controller 4 may control the actuation of the belt movement section 313 at any time as long as the time is within the correction frame 61.

Moreover, with the present example, the order of the first correction frame 611 and the second correction frame 612 is set, assuming that the time required to move the seat by the seat actuator 311 is longer than the time required to deploy the corrective airbag by the corrective airbag actuator 312. However, if there is a possibility that the time required to move the seat is shorter than the time required to deploy the corrective airbag based on, for example, the result of detection by the inside detector 22, the order of the first correction frame 611 and the second correction frame 612 may be exchanged, or the actuation control of the seat actuator 311 and the corrective airbag actuator 312 may be performed at the same time. By this means, it is possible to shorten the time required to control the actuation of the correction unit 31, that is, to shorten the entire correction frame 61. Therefore, it is possible to certainly and promptly allow the passenger to sit in an appropriate posture to prepare for a collision.

In the restraint frame 62, the restraint unit 32 illustrated in FIG. 1 is actuated to restrain the passenger on the seat. That is, in the restraint frame 62, the controller 4 controls the actuation of the belt reeler 321 and the restraint airbag actuator 322. The restraint frame 62 is adjacent to the correction frame 61. The correction frame 61 is set before the restraint frame 62. With the present example, one restraint frame 62 is provided. However, this is by no means limiting, and the restraint frame 62 may be divided into a plurality of frames like the correction frame 61, and the actuation control of the members of the restraint unit 32 may be performed in a plurality of steps, as long as there is enough time until a collision.

Here, it is preferred that reversible members which can be actuated multiple times are used for the correction unit 31, and meanwhile, irreversible members which can be actuated only one time are used for the restraint unit 32. To be more specific, the actuation control of the seat actuator 311, the corrective airbag actuator 312, and the belt movement section 313 of the correction unit 31 may be performed multiple times to move the seat, to expand and contract the corrective airbag, and to move the seatbelt, respectively. Meanwhile, the actuation control of the belt reeler 321 and the restraint airbag actuator 322 of the restraint unit 32 may be performed only one time to reel the seatbelt and to deploy the restraint airbag, respectively. In particular, the corrective airbag is a reversible member capable of expanding and contracting by injecting and discharging the air or gas, and meanwhile, the restraint airbag is an irreversible member capable of deploying by injecting the gas generated by the explosion of gunpowder only one time. The deployment power of the restraint airbag is greater than that of the corrective airbag, and therefore the power of the restraint airbag to restrain the passenger is greater than the power of the corrective airbag to correct the sitting posture of the passenger.

By using the reversible members for the correction unit 31, when there is no possibility of a collision in the correction frame 61, that is, when it is determined that the own vehicle A can avoid a collision with the object B, it is possible to stop the actuation control of the correction unit 31, and to prepare for the possibility of a collision with another object. After that, it is possible to return the sitting posture of the passenger to that in the state before the actuation control of the correction unit 31. Therefore, in a case where the passenger got relaxed before the actuation control of the correction unit 31, it is possible to return the sitting posture of the passenger to the relaxed posture. Moreover, by using the irreversible members for the restraint unit 32, it is possible to reliably and tightly restrain the passenger at the latest timing of the time frame 6, that is, when the object B makes its closest approach to the own vehicle A and an immediate danger is coming.

Next, a control process using the passenger protection apparatus 1 will be described with reference to FIG. 3. Here, FIG. 3 is a flowchart illustrating a process of controlling the actuation of the adjuster 3 by using the passenger protection apparatus 1 illustrated in FIGS. 1 and 2.

First, the setting unit 5 determines whether there is a possibility of a collision (step S1). When it is determined that there is a high possibility of a collision between the object B and the own vehicle A illustrated in FIG. 2, to be more specific, the possibility of a collision is higher than a predetermined threshold, based on the result of the detection by the outside detector 21, the step moves to the next step (YES of step S1). On the other hand, when it is determined that there is no possibility of a collision or the possibility of a collision is lower than the threshold although the object B has been detected, this process is ended (NO of step S1). It is possible to determine whether the possibility of a collision is high or low, based on the distance between the own vehicle A and the object B, the relative velocity, the moving directions of the own vehicle A and the object B, and the size of the object B. In addition, when the object B is a vehicle, it is possible to determine whether the possibility of a collision is high or low, based on the condition of the driver of the object B (for example, how much recognition of the own vehicle A, and the line of sight of the driver), and the running environment such as the width of the road.

When it is determined that there is a high possibility of a collision (YES of step S1), the setting unit 5 sets the time frame 6 illustrated in FIG. 2 (step S2). In this step, the setting unit 5 sets the time domain 6 by deriving the period of time until a collision occurs based on the result of the detection by the outside detector 21, such as the distance between the own vehicle A and the object B, the relative velocity, and the respective moving directions of the own vehicle A and the object B, and by dividing the derived period of time until a collision into a plurality of frames at an appropriate ratio. The time frame 6 set here is composed of the first correction frame 611, the second correction frame 612, and the restraint frame 62. The setting unit 5 outputs a signal indicating the set time frame 6 to the controller 4.

Next, the controller 4 determines whether the object B is entering the first correction frame 611 (step S3). When the controller 4 determines that the object B is entering the first correction frame 611, based on the time frame 6 set by the setting unit 5 and the result of the detection by the outside detector 21, the step moves to the next step (YES of step S3). On the other hand, when determining that the object B has not entered the first correction frame 611, the controller 4 repeats the step 3 until the object B entering the first correction frame 611 is detected (NO of step S3).

When determining that the object B is entering the first correction frame 611 (YES of step S3), the controller 4 controls the actuation of the seat actuator 311 of the correction unit 31, based on the result of the detection by the inside detector 22. In this step, the seat actuator 311 is actuated to move the seat until the current position and inclination of the seat detected by the inside detector 22 becomes the position and inclination that allows the protection device to fulfill its normal protection function. The position and inclination of the seat that allows the protection device to fulfill its normal protection function is expected by the protection device as the proper position and inclination of the passenger, and in general, this position and inclination of the seat may allow effortless manual driving. Therefore, in this step, for example, when the seat is moved forward and located closer to the steering wheel than usual during the manual driving, or when the seat is reclined at a large angle and the passenger gets relaxed during the automated driving, the seat actuator 311 is actuated to return the position in the front-to-back direction and the inclination of the seat to the proper position and inclination.

Next, the controller 4 determines whether the object B is entering the second correction frame 612 (step S5). When the controller 4 determines that the object B is entering the second correction frame 612, based on the time frame 6 set by the setting unit 5 and the result of the detection by the outside detector 21, the step moves to the next step (YES of step S5). On the other hand, when determining that the object B has not entered the second correction frame 612, the controller 4 repeats the step S5 until the object B entering the second correction frame 612 is detected (NO of step S5).

When determining that the object B is entering the second correction frame 612 (YES of step S5), the controller 4 controls the actuation of the corrective airbag actuator 312 of the correction unit 31 (second actuation control), based on the result of the detection by the inside detector 22 (step S6). In this step, the corrective airbag actuator 312 actuates the corrective airbag to move the passenger on the seat until the current sitting position of the passenger detected by the inside detector 22 becomes the position that allows the protection device to fulfill its normal protection function. The corrective airbag forms a convex portion on the surface of the seat cushion and the seat back to press the passenger, so that the passenger can sit on the seat in the proper position. With the present example, in particular, a frontal collision of the own vehicle A with the object B is assumed, and therefore there is a high possibility that the passenger is protected by a front airbag in the collision. In this case, it is preferred that the sitting position of the passenger is moved to an approximate center of the seat in the width direction by the corrective airbag. Meanwhile, when a lateral collision of the own vehicle A with the object B is assumed, it is preferred to minimize or delay the contact of the passenger with a window and a door. In this case, the sitting position of the passenger on the seat should be moved to the opposite side of the detected object in the right-to-left direction.

Next, the controller 4 determines whether the object B is entering the restraint frame 62 (step S7). When the controller 4 determines that the object B is entering the restraint frame 62, based on the time frame 6 set by the setting unit 5 and the result of the detection by the outside detector 21, the step moves to the next step (YES of step S7). On the other hand, when determining that the object has not entered the restraint frame 62, the controller 4 repeats the step S7 until the object B entering the restraint frame 62 is detected (NO of step S7).

When determining that the object B is entering the restraint frame 62 (YES of step S7), the controller 4 controls the actuation of the belt reeler 321 and the restraint airbag actuator 322 of the restraint unit 32 (step S8). In this step, the belt reeler 321 reels the seatbelt, and the restraint airbag actuator 322 deploys the restraint airbag to restrain the passenger on the seat, and therefore it is possible to almost fix the sitting posture of the passenger which has been corrected to sit in the proper position by the correction unit 31 in the above-described steps. When restraint airbags deploy from at least the seat cushion or the seat back on both sides to sandwich the passenger sitting in the proper position between them, it is possible to more firmly restrain the passenger than when only the seatbelt is used. In particular, when a lateral collision is predicted, it is preferred to prevent the passenger from moving from side to side in the collision, and therefore it is desired to sandwich the passenger between the restraint airbags on both sides so as to restrain the passenger.

In a case where there is less time until a collision occurs, the object B may enter the restraint frame 62 while the correction unit 31 is actuated. If this situation is predicted based on the result of the detection by the detector 2, it is preferred to actuate the belt movement section 313 under the first actuation control or the second actuation control of the correction unit 31. To be more specific, for example, when the actuation control of the restraint unit 32 is started while the passenger is moved under the first actuation control and the second actuation control of the correction unit 31, there is a possibility that the seatbelt is away from the passenger, or is not located in the start position for reeling. In this case, it is preferred that the controller 4 controls the actuation of the belt movement section 313 to cause the seatbelt to approach the passenger or to move the seatbelt to an appropriate position for reeling, based on the result of the detection by the inside detector 22. By this means, it is possible to successfully restrain the passenger even though there is less time until a collision occurs.

In this way, the process of adjusting the sitting posture of the passenger, which includes the correction of the sitting posture and the restraint of the passenger to prepare for a collision between the own vehicle A and the object B is completed. In the future, with increasing the number of vehicles driven by automated driving control or advanced driving support control, the degree of freedom of the sitting posture of the passenger will be improved, compared to the existing vehicles manually driven. In this case, even though conventional protection devices such as an airbag, and a pretensioner of the seatbelt are actuated, it may not be possible to provide a normal protection performance to protect the passenger sitting on the seat in an unexpected posture. To solve this problem, even though, for example, the driver sits on the driving seat moved backward and reclined during the automated driving, the passenger protection apparatus 1 according to the present example can move the passenger to the sitting position to sit in a posture that allows the protection devices to provide the normal protection performance, and restrain the passenger. By this means, it is possible to appropriately protect the passenger by the protection devices, and to reduce or eliminate the harmfulness of the protection devices due to the unexpected sitting posture of the passenger.

With the example illustrated in FIG. 3, the actuation control of the correction unit 31 is divided into a plurality of steps, the first actuation control (step 4) and the second actuation control (step 6). By this means, it makes it easy to predict a change in the sitting posture of the passenger for each of the steps to clarify the change in the sitting posture. Moreover, the actuation control of the seat actuator 311 to move the seat, which is required to a long period of time, is set in the first correction frame 611 as the earlier frame, and the first actuation control is performed. By this means, it is possible to change the sitting posture of the passenger to sit in the proper position well in advance.

Figure 4:
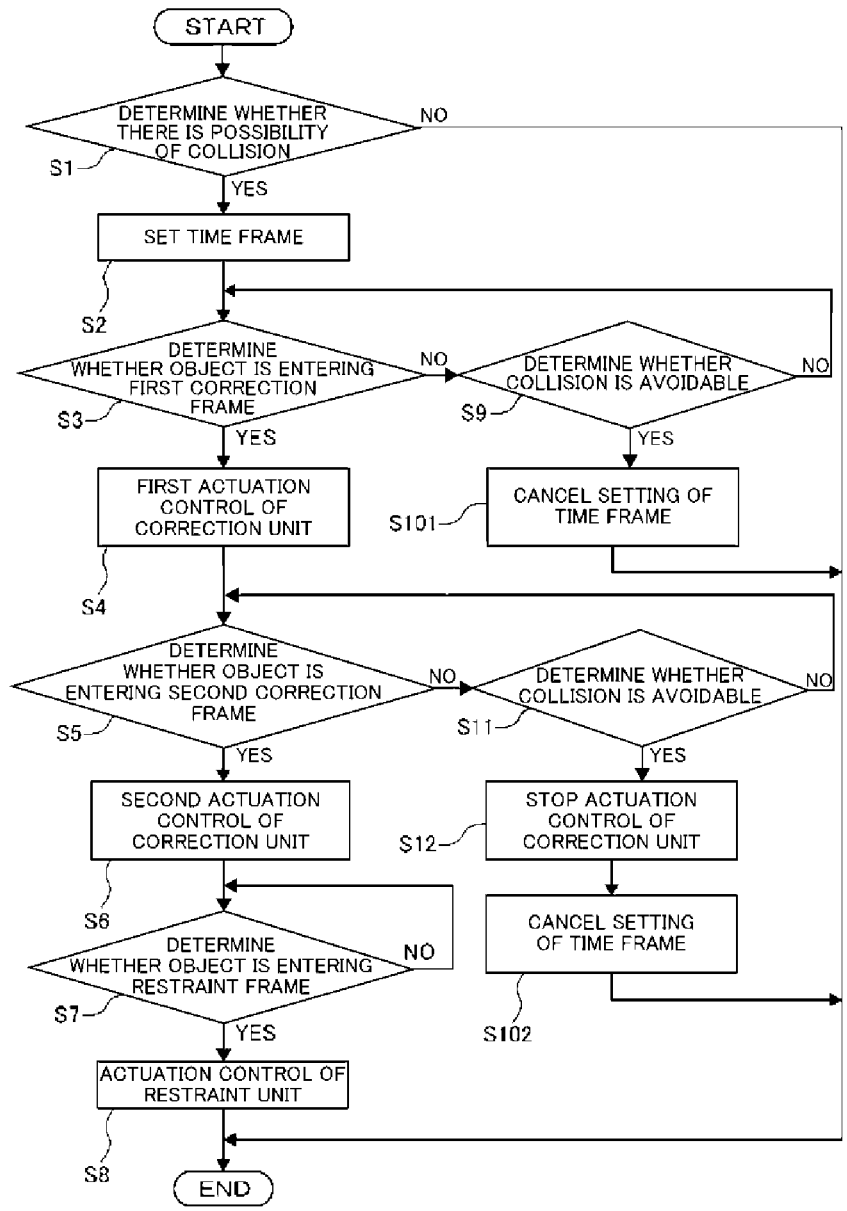
FIG. 4 is a flowchart illustrating another control process using the passenger protection apparatus illustrated in FIG. 1.

Next, a control process including the control depending on the situation of the own vehicle A will be described with reference to FIG. 4. FIG. 4 is a flowchart illustrating a process of controlling the actuation of the adjuster 3 using the passenger protection apparatus 1 illustrated in FIGS. 1 and 2. Here, in the process illustrated in FIG. 4, the same steps as in the process illustrated in FIG. 3 are assigned the same reference numerals as those in FIG. 3, and detailed description of them will be omitted.

First, the process illustrated in FIG. 4 is different from the process illustrated in FIG. 3 in that, after the step of determining whether there is a possibility of a collision by the setting unit 5 (step S1), and the step of setting the time frame 6 by the setting unit 5 (step S2), it is determined that the object B has not entered the first correction frame 611 (NO of step S3) in the step of determining whether the object B is entering the first correction frame 611 (step S3).

When determining that the object B has not entered the first correction frame 611 (NO of step S3), the controller 4 determines whether a collision is avoidable (step S9). In this step, the possibility of a collision between the own vehicle A and the object B is derived again based on the result of the detection by the outside detector 21, and, for example, when the possibility of a collision remains higher than a predetermined threshold, it is still difficult to avoid a collision, and therefore the controller 4 repeatedly determines whether the object B is entering the first correction frame 611 (NO of step S9). When the possibility of a collision derived again is lower than the predetermined threshold, a collision is avoidable, and therefore the step moves to the next step (YES of step S9).

When it is determined that a collision is avoidable (YES of step S9), the time frame 6 set by the setting unit 5 is not required, and therefore the controller 4 cancels the setting of the time frame 6 by the setting unit 5 (step S101). By this means, the time frame 6 is deleted, and there is no possibility of a collision, and therefore the process is ended.

Moreover, this process is different from the process illustrated in FIG. 3 in that it is determined that the object B has not entered the second correction frame 612 (NO of step S5) in the step of determining whether the object B is entering the second correction frame 612 (step S5).

When determining that the object B has not entered the second correction frame 612 (NO of step S5), the controller 4 determines whether a collision is avoidable (step S11). In this step, the possibility of a collision between the own vehicle A and the object B is derived again based on the result of the detection by the outside detector 21, and, for example, when the possibility of a collision remains higher than a predetermined threshold, it is still difficult to avoid a collision, and therefore the controller 4 repeatedly determines whether the object B is entering the second correction frame 612 (NO of step S11). When the possibility of a collision derived again is lower than the predetermined threshold, a collision is avoidable, and therefore the step moves to the next step (YES of step S11).

When it is determined that a collision is avoidable (YES of step S11), the first actuation control of the correction unit 31 and the time frame 6 set by the setting unit 5 are not required. Therefore, the controller 4 stops the actuation control of the seat actuator 311, and preferably returns the seat to the original position (step S12) and cancels the setting of the time frame 6 by the setting unit 5 (step S102). In this step, the movement of the seat is stopped or the seat is returned to the original position, and the time frame 6 is deleted, and accordingly there is no possibility of a collision. Consequently, the process is ended.

With the example illustrated in FIG. 4, the actuation control of the correction unit 31 is divided into a plurality of steps, the first actuation control (step S4) and the second actuation control (step S6), and the control to stop the actuation of each of the members (steps S101, S102, and S12) is performed in an appropriate manner, and therefore it is possible to realize careful control depending on the situation of the own vehicle A.

The actuation control of the adjuster 3 to address the frontal collision and the lateral collision has been described. However, this is by no means limiting, and in the case of an oblique collision, for example, the corrective airbag actuator 312 is actuated to move the sitting position of the passenger to a position to protect from the oblique collision, and therefore it is possible to allow the protection device to satisfactorily fulfill its protection performance.

With the example, at least the correction frame is set in the time frame until a collision with an object, and the sitting posture of the passenger is corrected in the correction frame even through the passenger sits in any posture. By this means, it is possible to provide the passenger protection apparatus capable of consistently providing the normal protection performance of the protection devices in a collision.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:

1. A passenger protection apparatus for a vehicle, the apparatus comprising:
    a detector configured to detect an environmental condition outside a vehicle;
    an adjuster configured to be able to correct a sitting posture of a passenger to sit on a seat in a proper position;
    a controller configured to control actuation of the adjuster; and
    a setting unit configured to set a time frame until a predicted collision between an own vehicle and an object outside the vehicle, based on a result of detection by the detector, and wherein the setting unit, upon setting the time frame until a predicted collision, divides that time frame into a plurality of frames inclusive of a correction frame and a restraint frame, and
    wherein the controller controls the actuation of the adjuster to correct the sitting posture of the passenger in the correction frame contained in the time frame.

2. The passenger protection apparatus for a vehicle according to claim 1, wherein:
    the correction frame contains a plurality of corrective frames to correct the sitting posture of the passenger to a different posture; and
    the controller controls the actuation of the adjuster in a plurality of steps in the plurality of corrective frames.

3. The passenger protection apparatus for a vehicle according to claim 2, wherein:
    the detector detects environmental conditions outside and inside the vehicle;
    the setting unit sets the time frame based on a result of detection outside the vehicle by the detector; and
    the controller controls the actuation of the adjuster, based on results of detection outside and inside the vehicle by the detector.

4. The passenger protection apparatus for a vehicle according to claim 3, wherein when a collision with the object is avoidable based on the result of the detection by the detector, the controller stops controlling the actuation of the adjuster in the correction frame.

5. The passenger protection apparatus for a vehicle according to claim 2, wherein when a collision with the object is avoidable based on the result of the detection by the detector, the controller stops controlling the actuation of the adjuster in the correction frame.

6. The passenger protection apparatus for a vehicle according to claim 1, wherein:
the detector detects environmental conditions outside and inside the vehicle;
the setting unit sets the time frame based on a result of detection outside the vehicle by the detector; and
the controller controls the actuation of the adjuster, based on results of detection outside and inside the vehicle by the detector.

7. The passenger protection apparatus for a vehicle according to claim 6, wherein when a collision with the object is avoidable based on the result of the detection by the detector, the controller stops controlling the actuation of the adjuster in the correction frame.

8. The passenger protection apparatus for a vehicle according to claim 1, wherein when a collision with the object is avoidable based on the result of the detection by the detector, the controller stops controlling the actuation of the adjuster in the correction frame.

9. The passenger protection apparatus for a vehicle according to claim 1,
wherein the controller controls the actuation of the adjuster to correct the sitting posture of the passenger in the correction frame and operates an explosive inflated airbag in the restraint frame subsequent to initiation of the actuation of the adjuster to correct the sitting posture.

10. The passenger protection apparatus for a vehicle according to claim 1, wherein the adjuster includes a reversible member adapted to be actuated multiple times, and an irreversible member being able to be actuated only one time; and
the controller controls actuation of the reversible member in the correction frame, and controls actuation of the irreversible member in the restraint frame.

11. The passenger protection apparatus for a vehicle according to claim 1, wherein the plurality of frames are set by the setting unit based on one of (a) dividing the time frame until a predicted collision equally or (b) a ratio involving the time required to actuate the correction unit and the time required to actuate a restraint unit during the restraint frame.

12. A passenger protection apparatus for a vehicle, the apparatus comprising:
a detector configured to detect an environmental condition outside a vehicle;
an adjuster configured to be able to correct a sitting posture of a passenger to sit on a seat in a proper position;
a controller configured to control actuation of the adjuster; and
a setting unit configured to set a time frame divided into a plurality of frames until a predicted collision between an own vehicle and an object outside the vehicle, based on a result of detection by the detector;
wherein the controller controls the actuation of the adjuster to correct the sitting posture of the passenger in a correction frame at least contained in the time frame, and wherein:
the adjuster can restrain the passenger on the seat; and
the setting unit sets a restraint frame of the time frame to restrain the passenger on the seat, and sets the correction frame before the restraint frame, the correction frame being adjacent to the restraint frame.

13. The passenger protection apparatus for a vehicle according to claim 12, wherein:
the adjuster includes a reversible member being able to be actuated multiple times, and an irreversible member being able to be actuated only one time; and
the controller controls actuation of the reversible member in the correction frame, and controls actuation of the irreversible member in the restraint frame.

14. The passenger protection apparatus for a vehicle according to claim 1, wherein:
the detector detects environmental conditions outside and inside the vehicle;
the setting unit sets the time frame based on a result of detection outside the vehicle by the detector; and
the controller controls the actuation of the adjuster, based on results of detection outside and inside the vehicle by the detector.

15. The passenger protection apparatus for a vehicle according to claim 14, wherein when a collision with the object is avoidable based on the result of the detection by the detector, the controller stops controlling the actuation of the adjuster in the correction frame.

16. The passenger protection apparatus for a vehicle according to claim 13, wherein when a collision with the object is avoidable based on the result of the detection by the detector, the controller stops controlling the actuation of the adjuster in the correction frame.

17. The passenger protection apparatus for a vehicle according to claim 12, wherein:
the detector detects environmental conditions outside and inside the vehicle;
the setting unit sets the time frame based on a result of detection outside the vehicle by the detector; and
the controller controls the actuation of the adjuster, based on results of detection outside and inside the vehicle by the detector.

18. The passenger protection apparatus for a vehicle according to claim 17, wherein when a collision with the object is avoidable based on the result of the detection by the detector, the controller stops controlling the actuation of the adjuster in the correction frame.

19. The passenger protection apparatus for a vehicle according to claim 12, wherein when a collision with the object is avoidable based on the result of the detection by the detector, the controller stops controlling the actuation of the adjuster in the correction frame.

20. A passenger protection apparatus for a vehicle, the apparatus comprising:
a detector configured to detect an environmental condition outside a vehicle;
an adjuster configured to be able to correct a sitting posture of a passenger to sit on a seat in a proper position; and
circuitry configured to
control actuation of the adjuster; and
set a time frame until a predicted collision between an own vehicle and an object outside the vehicle, based on a result of detection by the detector, and, upon setting the time frame until a predicted collision, divides that time frame into a plurality of frames inclusive of a correction frame and a restraint frame, and wherein the circuitry controls the actuation of the adjuster to correct the sitting posture of the passenger in the correction frame contained in the time frame.

* * * * *